United States Patent
Gildert

(10) Patent No.: US 12,030,196 B2
(45) Date of Patent: Jul. 9, 2024

(54) SYSTEMS, METHODS, AND COMPUTER PROGRAM PRODUCTS FOR AUTOMATING TASKS

(71) Applicant: Sanctuary Cognitive Systems Corporation, Vancouver (CA)

(72) Inventor: Suzanne Gildert, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/373,584

(22) Filed: Sep. 27, 2023

(65) Prior Publication Data

US 2024/0100704 A1 Mar. 28, 2024

Related U.S. Application Data

(60) Provisional application No. 63/410,475, filed on Sep. 27, 2022.

(51) Int. Cl.
*B25J 9/16* (2006.01)
*B25J 3/00* (2006.01)
(Continued)

(52) U.S. Cl.
CPC ............ *B25J 9/1689* (2013.01); *B25J 3/00* (2013.01); *B25J 9/0006* (2013.01); *B25J 9/1653* (2013.01);
(Continued)

(58) Field of Classification Search
CPC ...... B25J 9/0006; B25J 9/1671; B25J 9/1689; G06F 40/40; G05B 2219/36184;
(Continued)

(56) References Cited

U.S. PATENT DOCUMENTS 9,616,570 B2 4/2017 Nihei et al.
2021/0012772 A1* 1/2021 Peck .................. G10L 15/25
(Continued)

FOREIGN PATENT DOCUMENTS

CA 3149261 A1 8/2022

OTHER PUBLICATIONS

Notification of Transmittal of the International Search Report and the Written Opinion of the International Searching Authority, or the Declaration, International Patent Application No. PCT/CA2023/051276 (Nov. 21, 2023).

*Primary Examiner* — Dale Moyer
(74) *Attorney, Agent, or Firm* — Thomas Mahon; Adenike Adebiyi

(57) ABSTRACT

Systems, methods, and computer program products for automating tasks are described. A multi-step framework enables a gradient towards task automation. An agent performs a task while sensors collect data. The data are used to generate a script that characterizes the discrete actions executed by the agent in the performance of the task. The script is used by a robot teleoperation system to control a robot to perform the task. The robot teleoperation system maps the script into an ordered set of action commands that the robot is operative to auto-complete to enable the robot to semi-autonomously perform the task. The ordered set of action commands is converted into an automation program that may be accessed by an autonomous robot and executed to cause the autonomous robot to autonomously perform the task. In training, simulated instances of the robot may perform simulated instances of the task in simulated environments.

19 Claims, 5 Drawing Sheets

(51) Int. Cl.
*B25J 9/00* (2006.01)
*G06F 40/40* (2020.01)

(52) U.S. Cl.
CPC .......... *B25J 9/1661* (2013.01); *B25J 9/1671* (2013.01); *G06F 40/40* (2020.01)

(58) Field of Classification Search
CPC .......... G05B 2219/40116; G05B 2219/40153; G05B 2219/40391; G05B 2219/40395
See application file for complete search history.

(56) References Cited

U.S. PATENT DOCUMENTS

2022/0148586 A1\* 5/2022 Sarkar .................... B25J 9/1679
2023/0031545 A1\* 2/2023 Oleynik ................ G05B 19/42

\* cited by examiner

SYSTEMS, METHODS, AND COMPUTER PROGRAM PRODUCTS FOR AUTOMATING TASKS

TECHNICAL FIELD

The present systems, methods, and computer program products generally relate to automating tasks, and particularly relate to a framework for automating a wide range of tasks through performance by one or more autonomous robot systems.

BACKGROUND

Description of the Related Art

Robots are machines that may be deployed to perform tasks. Robots may come in a variety of different form factors, including humanoid form factors. Humanoid robots may be operated by tele-operation systems through which the robot is caused to emulate the physical actions of a human operator or pilot. Special-purpose robots may be designed to perform a specific task, whereas general purpose robots may be designed to perform a multitude of tasks.

Humans perform many tasks in their personal and work lives. Examples of tasks include everything from making a bed, to washing dishes, to loading a dishwasher, to mowing a lawn, to taking inventory, to checking out customers, to stocking shelves, to painting, to hairstyling, to preparing a meal, to cleaning, to taking measurements, to performing calculations, to recording data, to performing analyses, to creating art/music, to performing art/music, to building, to manufacturing, to assembling, to destroying, to disassembling, to displacing, to pick-and-placing, to navigating, and on and on. In many cases, there is a strong desire, and an ongoing need, to automate various tasks so that humans may direct their time and/or attention to other things.

BRIEF SUMMARY

A method of automating a task may be summarized as including: providing natural language instructions to cause a first agent to perform the task; collecting, by at least one sensor, data of the first agent performing the task; generating a script based on the data of the first agent performing the task, wherein the script characterizes, in a human-readable language, an ordered set of actions executed by the first agent to perform the task; generating, by a robot teleoperation system, an ordered set of action commands based on the script, the ordered set of action commands selected from a library of action commands available in the robot teleoperation system; causing, by the robot teleoperation system, the robot to execute the ordered set of action commands to perform the task; generating an automation program based on the ordered set of action commands; and executing the automation program by the robot, wherein executing the automation program by the robot causes the robot to autonomously perform the task. The first agent may be a human worker and the robot may be a humanoid robot. The library of action commands available in the robot teleoperation system may include all genericized reusable work primitives necessary to enable the robot to complete multiple different work objectives. The library of action commands available in the robot teleoperation system may include a library of parameterizable action commands, each of which the robot is operative to auto-complete upon receipt of execution instructions from the robot teleoperation system. Causing, by the robot teleoperation system, the robot to execute the ordered set of action commands to perform the task may include causing, by the robot teleoperation system, the robot to auto-complete each parameterizable action command in the ordered set of action commands to semi-autonomously perform the task.

Causing, by the robot teleoperation system, the robot to execute the ordered set of action commands to perform the task may include causing, by the robot teleoperation system, a simulated instance of the robot to execute the ordered set of action commands to perform a simulated instance of the task. The method may further include causing, by the robot teleoperation system, a simulated instance of the robot to execute the ordered set of action commands to perform a simulated instance of the task before causing, by the robot teleoperation system, the robot to execute the ordered set of action commands to perform the task.

The robot teleoperation system may include a graphical user interface, and generating, by the robot teleoperation system, the ordered set of action commands based on the script may include: presenting, by the graphical user interface of the robot teleoperation system, at least a portion of the library of action commands to a user; and receiving, by the graphical user interface of the robot teleoperation system, a selection of the ordered set of action commands from the user. The robot teleoperation system may further include an analogous teleoperation subsystem, and the method may further include: causing, by the analogous teleoperation subsystem, the robot to perform the task based on the script before generating, by the robot teleoperation system, the ordered set of action commands based on the script. Causing, by the analogous teleoperation subsystem, the robot to perform the task based on the script may include causing, by the analogous teleoperation subsystem, the robot to perform the task based on the script under manual control by a pilot. Causing, by the analogous teleoperation subsystem, the robot to perform the task based on the script under manual control by the pilot may include capturing, by the analogous teleoperation subsystem, data of the pilot performing the ordered set of actions characterized in the script and causing, in real-time, the robot to emulate the ordered set of actions performed by the pilot. Causing, by the analogous teleoperation subsystem, the robot to perform the task based on the script under manual control by the pilot may include causing, by the analogous teleoperation subsystem, a simulated instance of the robot to perform a simulated instance of the task based on the script under manual control by the pilot. The method may further include causing, by the analogous teleoperation subsystem, a simulated instance of the robot to perform a simulated instance of the task based on the script under manual control by the pilot before causing, by the analogous teleoperation subsystem, the robot to perform the task based on the script under manual control by the pilot.

The method may further include validating the script before generating, by the robot teleoperation system, the ordered set of action commands based on the script, wherein validating the script may include providing the script to a second agent and confirming that the second agent is able to perform the task based on the script.

Generating a script based on the data of the first agent performing the task may include executing, by at least one processor, processor-executable instructions that cause the at least one processor to automatically generate the script based on the data of the first agent performing the task.

Executing the automation program by the robot, wherein executing the automation program by the robot causes the robot to autonomously perform the task, may include executing the automation program by a simulated instance of the robot, wherein executing the automation program by the simulated instance of the robot causes the simulated instance of the robot to autonomously perform a simulated instance of the task.

The method may further include executing the automation program by a simulated instance of the robot, wherein executing the automation program by the simulated instance of the robot causes the simulated instance of the robot to autonomously perform a simulated instance of the task before executing the automation program by the robot, wherein executing the automation program by the robot causes the robot to autonomously perform the task.

The at least one sensor may include at least one sensor selected from a group consisting of: a camera and a tactile sensor.

A method of programming a robot to autonomously perform a task may be summarized as including: collecting data of an agent performing the task; generating a script based on the data of the agent performing the task, wherein the script characterizes an ordered set of actions executed by the agent to perform the task; generating an ordered set of action commands based on the script, the ordered set of action commands selected from a library of action commands, each of which the robot is operative to autonomously execute; generating an automation program based on the ordered set of action commands; and executing the automation program by the robot, wherein executing the automation program by the robot causes the robot to autonomously perform the task. Executing the automation program by the robot may cause the robot to autonomously perform each action command in the ordered set of action commands in order to complete the task.

A robot system may be summarized as including: a robot body; at least one processor; and at least one non-transitory processor-readable storage medium communicatively coupled to the at least one processor, the non-transitory processor-readable storage medium storing processor-executable instructions which, when executed by the at least one processor, cause the robot system to: receive data of an agent performing a task; generate a script based on the data of the agent performing the task, wherein the script characterizes an ordered set of discrete actions executed by the agent to perform the task; generate an ordered set of action commands based on the script, the ordered set of action commands selected from a library of action commands, each of which the robot body is operative to autonomously execute; generate an automation program based on the ordered set of action commands; and execute the automation program by the robot body, wherein executing the automation program by the robot body causes the robot body to autonomously perform the task. The agent may be a human worker and the robot body may be a humanoid robot. The library of action commands may include all genericized reusable work primitives necessary to enable the robot body to complete multiple different tasks. The library of action commands may include a library of parameterizable action commands, each of which the robot body is operative to auto-complete upon receipt of execution instructions from the automation program.

The robot system may further include a robot teleoperation system communicatively coupled to the robot body, wherein the at least one non-transitory processor-readable storage medium further stores processor-executable instructions that, when executed by the robot teleoperation system, cause the robot body to execute the ordered set of action commands to perform the task. The robot teleoperation system may include an analogous teleoperation subsystem. The robot teleoperation system may include a graphical user interface.

A computer program product may be summarized as including at least one non-transitory processor-readable storage medium storing a library of action commands each of which a robot body is operative to autonomously execute, and processor-executable instructions or data that, when executed by at least one processor of a processor-based system, cause the processor-based system to: receive data of an agent performing a task; generate a script based on the data of the agent performing the task, wherein the script characterizes an ordered set of discrete actions executed by the agent to perform the task; generate an ordered set of action commands based on the script, the ordered set of action commands selected from the library of action commands; and generate an automation program based on the ordered set of action commands. The at least one non-transitory processor-readable storage medium may further store processor-executable instructions or data that, when executed by at least one processor of a processor-based system, cause the processor-based system to execute the automation program by the robot body, wherein executing the automation program by the robot body causes the robot body to autonomously perform the task. The agent may be a human worker and the robot body may be a humanoid robot. The library of action commands may include all genericized reusable work primitives necessary to enable the robot body to complete multiple different tasks. The library of action commands may include a library of parameterizable action commands, each of which the robot body is operative to auto-complete upon receipt of execution instructions from the automation program.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
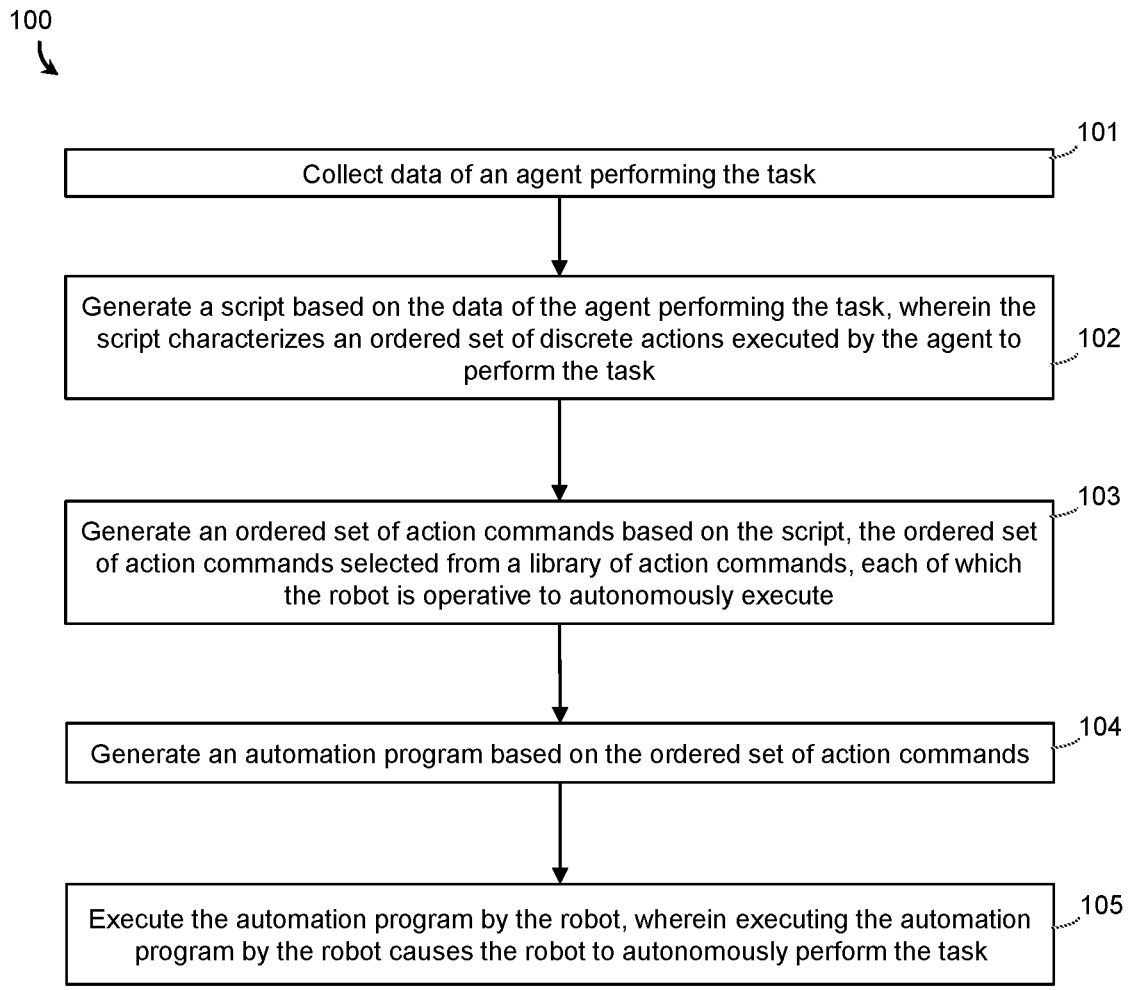
FIG. 1 is a flow diagram showing an exemplary method of programming a robot to autonomously perform a task in accordance with the present systems, methods, and computer program products.

The following description sets forth specific details in order to illustrate and provide an understanding of the various implementations and embodiments of the present systems, methods, and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, and computer program products.

An automated task is a task that can be performed or completed automatically or autonomously with little to no involvement from a human. In the context of the present systems, methods, and computer program products, an automated task is a task that can be performed or completed by an autonomous robot system with little to no human intervention. In some cases, instructions for performing an automated task (including, for example, task parameters such as the objective(s) of the task, task conditions or requirements, a start state, and/or an end date) may be specified by a human or other system, and/or a human or other system may indicate or confirm when a task is complete, but otherwise an automated task may be completed by an autonomous robot system without further contribution or intervention from a human. The various implementations described herein provide systems, methods, and computer program products for automating tasks.

As used herein, the term "automating a task" is generally used to refer to enabling a capability by which a task may be (e.g., is) autonomously performed. In some implementations, "automating a task" includes training or otherwise enabling an autonomous system (e.g., including an autonomous robot) to autonomously perform the task.

FIG. 1 is a flow diagram showing an exemplary method 100 of programming a robot to autonomously perform a task in accordance with the present systems, methods, and computer program products. Certain acts of method 100 may be performed by at least one processor or processing unit (hereafter "processor") of the a robot system communicatively coupled to a non-transitory processor-readable storage medium of the robot system and, in some implementations, certain acts of method 100 may be performed by peripheral components of the robot system that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. The non-transitory processor-readable storage medium of the robot system may store data (including, e.g., a library of action commands or reusable work primitives) and/or processor-executable instructions that, when executed by the at least one processor, cause the robot system to perform various acts of method 100 (or method 200, or any of the methods contemplated herein) and/or cause the at least one processor to perform those acts of method 100 (or method 200, or any of the methods contemplated herein) that are performed by the at least one processor. Generally, the robot systems described herein may comprise or communicate with, via communications and networking hardware communicatively coupled to the robot system's at least one processor, remote systems and/or remote non-transitory processor-readable storage media. Thus, unless the specific context requires otherwise, references to a robot system's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot system and the rest of the robot hardware. In other words, a robot system's non-transitory processor-readable storage medium may include non-transitory processor-readable storage media located on-board the robot body and/or non-transitory processor-readable storage media located remotely from the robot body, unless the specific context requires otherwise.

Returning to FIG. 1, method 100 includes five acts 101, 102, 103, 104, and 105, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, data are collected while an agent performs the task to be automated. In some implementations, the data may be collected by a separate system/method and received by the robot system at 101. The task being automated by method 100 may include or consist of a wide range of different types of task depending on the specific implementation. In some implementations, method 100 may be deployed to automate virtually any task that a human might otherwise perform in their work or personal life, including without limitation: making a bed, washing dishes, loading a dishwasher, mowing a lawn, taking inventory, retail checkout, stocking shelves, painting, hairstyling, preparing a meal, cleaning, taking measurements, performing calculations, recording data, performing analyses, creating art/music, performing art/music, building, manufacturing, assembling, destroying, disassembling, displacing, pick-and-placing, navigating, manual labor, cognitive processes, and so on.

The agent performing the task may be a human worker. For example, the agent performing the task may be a person who has been instructed or trained in the performance of the task, or who otherwise is adept at or has the ability to perform the task. The agent may or may not use tools (e.g., hand tools such as a hammer, knife, saw, or screwdriver, and the like, and/or power tools such as a drill, reciprocating saw, nail gun, and the like) in the performance of the task.

In other implementations, the agent performing the task may include a robot or robot system, such as a special purpose robot that has been designed to be particularly adept at performing the task that is to be updated by method 100.

Data of the agent performing the task may be collected by at least one sensor. Depending on the specific implementation, the at least one sensor may be mounted in the environment of the agent and/or worn on the body of the agent. The at least one sensor may include at least one of: a camera, a microphone, a tactile/haptic/touch sensor, an inertial measurement unit, an accelerometer, a compass, a magnetometer, and/or a pressure sensor. In some implementations, the agent may wear a camera system, such as a GoPro® or HoloLens® system (or similar), oriented to record the actions performed by the agent's hands while the agent performs the task. More details of wearable sensors are provided in the description of FIG. 3. Advantageously, the at least one sensor used at 101 may be a "robot-like" sensor in the sense that the at least one sensor is analogous to a sensor or sensor(s) that may be included in a robot system.

At 102, a script is generated based on the data (collected at 101) of the agent performing the task. The script characterizes an ordered set of discrete actions (e.g., a sequence of steps) executed by the agent to perform the task. The script may be generated by a computer system comprising at least one processor communicatively coupled to at least one non-transitory processor-readable storage medium that stores data and/or processor-executable instructions that, when executed by the at least one processor, cause the at least one processor to generate the script (either automatically or in response to instructions or commands received from a user of the computer system). The computer system may be operated autonomously or with intervention by a human user. Regardless of how it is generated, the script characterizes an ordered set of discrete actions executed by the agent to perform the task, based on the data collected by at least one sensor at 101. Advantageously, the script may employ a structured yet human-readable language that enables the ordered set of discrete actions to be described analytically and methodically.

At 103, an ordered set of action commands is generated based on the script. The ordered set of action commands is selected from a library of action commands, each of which the robot is operative to autonomously execute. Each discrete action in the script may map to a respective one or more action command(s) in the library or action commands. In some implementations, the library of action commands may include a library of parameterizable action commands, each of which the robot is operative to auto-complete upon receipt of execution instructions (e.g., from a robot control system). In implementations where the robot is a general purpose robot operative to complete a multitude of different work objectives (e.g., different task types across different industries), the library of action commands may include all genericized reusable work primitives necessary to enable the general purpose robot to complete multiple different work objectives, as described in US Patent Publication US 2022-0258340 A1, which is incorporated herein by reference in its entirety.

In accordance with US Patent Publication US 2022-0258340 A1, a work objective may be deconstructed or broken down into a "workflow" comprising a set of "work primitives", where successful completion of the work objective involves performing each work primitive in the workflow. Depending on the specific implementation, completion of a work objective may be achieved by (i.e., a workflow may comprise): i) performing a corresponding set of work primitives sequentially or in series; ii) performing a corresponding set of work primitives in parallel; or iii) performing a corresponding set of work primitives in any combination of in series and in parallel (e.g., sequentially with overlap) as suits the work objective and/or the robot performing the work objective. Thus, in some implementations work primitives may be construed as lower-level activities, steps, or sub-tasks that are performed or executed as a workflow in order to complete a higher-level work objective. In the present systems, methods, and computer program products, generating an ordered set of action commands based on the script at 103 of method 100 may include generating a first workflow.

A library of action commands may be defined to include (comprise, or consist of) a library of "reusable" work primitives. A work primitive is reusable if it may be generically invoked, performed, employed, or applied in the completion of multiple different work objectives. For example, a reusable work primitive is one that is common to the respective workflows of multiple different work objectives. In some implementations, a reusable work primitive may include at least one variable that is defined upon or prior to invocation of the work primitive. For example, "pick up *object*" may be a reusable work primitive where the process of "picking up" may be generically performed at least semi-autonomously in furtherance of multiple different work objectives and the *object* to be picked up may be defined based on the specific work objective being pursued.

The library of action commands may be defined, identified, developed, or constructed such that any given work objective across multiple different work objectives may be completed by executing a corresponding workflow (e.g., based on a corresponding script) comprising a particular combination and/or permutation of action commands selected from the library of action commands. Once such a library of action commands has been established, one or more robot(s) may be trained to autonomously execute or automatically perform each individual action command in the library of action commands without necessarily including the context of: i) a particular workflow of which the particular action command being trained is a part, and/or ii) any other action command that may, in a particular workflow, precede or succeed the particular action command being trained. In this way, a semi-autonomous robot may be operative to autonomously or automatically perform (i.e., auto-complete) each individual action command in a library of action commands and only require instruction, direction, or guidance from another party (e.g., from an operator, user, or pilot) when it comes to deciding which action command(s) to perform and/or in what order. In other words, an operator, user, or pilot may provide a workflow (e.g., based on a script) consisting of action commands to a semi-autonomous robot and the semi-autonomous robot may autonomously or automatically execute the action commands according to the workflow to complete a work objective. For example, a semi-autonomous humanoid robot may be operative to autonomously look left when directed to look left, autonomously open its right end effector when directed to open its right end effector, and so on, without relying upon detailed low-level control of such functions by a third party. Such a semi-autonomous humanoid robot may autonomously complete a work objective once given instructions regarding a workflow (e.g., based on a script) detailing which action commands it must perform, and in what order, in order to complete the work objective. Furthermore, in accordance with the present systems, methods, and computer program products, a robot may operate fully autonomously if it is trained or otherwise configured to analyze a work objective and independently define a corresponding workflow itself by deconstructing the work objective (e.g., based on a script) into a set of action commands from a library of action commands that the robot is operative to autonomously perform/execute.

In the context of a robot, action commands may correspond to basic low-level functions that the robot is operable to (e.g., autonomously or automatically) perform and that the robot may call upon or execute in order to achieve something. Examples of action commands for a humanoid robot include, without limitation: look up, look down, look left, look right, move right arm, move left arm, close right end effector, open right end effector, close left end effector, open left end effector, move forward, turn left, turn right, move backwards, and so on, as well as cognitive functions like analyze, calculate, plan, and determine; however, a person of skill in the art will appreciate that: i) the foregoing list of exemplary action commands for a humanoid robot is by no means exhaustive; ii) the present systems, methods, and computer program products are not limited in any way to robots having a humanoid form factor; and iii) the complete composition of any library of action commands depends on the design and functions of the specific robot for which the library of action commands is constructed.

A robot may be operative to perform any number of high-level functions based at least in part on its hardware and software configurations. For example, a robot with legs or wheels may be operative to move, a robot with a gripper may be operative to pick things up, and a robot with legs and a gripper may be operative to displace objects. The performance of any such high-level function generally requires the controlled execution of multiple low-level functions. For example, a mobile robot must exercise control of a number of different lower-level functions in order to controllably move, including control of mobility actuators (e.g., driving its legs or wheels) that govern functional parameters like speed, trajectory, balance, and so on. In accordance with the present systems, methods, and computer program products, the high-level functions that a robot is operative to perform are deconstructed or broken down into a set of basic components or constituents, referred to throughout this specification and the appended claims as "action commands". Unless the specific context require otherwise, action commands may be construed as the building blocks of which higher-level robot functions are constructed As will be discussed in more detail later on, in some implementations training a robot to autonomously perform an action command may be completed in a simulated environment. Once a robot has been trained to autonomously perform a library of action commands, tele-operation of the robot by a remote pilot may be abstracted to the level of action commands; i.e., a remote operator or pilot that controls the robot through a tele-operation system may do so by simply instructing the robot which action command(s) to perform and, in some implementations, in what order to perform them, and the robot may have sufficient autonomy or automation (resulting from, for example, the training described above) to execute a complete work objective based on such limited control instruction from the pilot.

"Clean a bathroom mirror" is an illustrative example of a work objective that can be deconstructed into a set of action commands to achieve a goal and for which the outcome is determinable. The goal in this case is a clean bathroom mirror, and an exemplary set of action commands (or workflow) that completes the work objective is as follows:

| Action Command Index | Action Command |
| --- | --- |
| 1 | Locate cleaning solution |
| 2 | Grasp the cleaning solution |
| 3 | Locate mirror |
| 4 | Aim the cleaning solution at the mirror |
| 5 | Dispense the cleaning solution onto the mirror |
| 6 | Locate the cleaning cloth |
| 7 | Grasp the cleaning cloth |
| 8 | Pass the cleaning cloth over the entire surface of the mirror |
| 9 | Return to ready |

A person of skill in the art will appreciate that the exemplary workflow above, comprising nine action commands, is used as an illustrative example of a workflow that may be deployed to complete the work objective of cleaning a bathroom mirror; however, in accordance with the present systems, methods, and computer program products the precise definition and composition of each action command and the specific combination and/or permutation of action command selected/executed to complete a work objective (i.e., the specific construction of a workflow, based on a corresponding script) may vary in different implementations. For example, in some implementations action commands 3, 4, and 5 above (i.e., locate mirror, aim the cleaning solution at the mirror, and dispense the cleaning solution onto the mirror) may all be combined into one higher-level action command as "spray cleaning solution on the mirror" whereas in other implementations those same action commands may be broken down into additional lower-level action commands as, for example:

Locate the mirror
Identify the boundaries of the mirror
Aim the cleaning solution at a first location within the boundaries of the mirror
Squeeze the cleaning solution
Aim the cleaning solution at a second location within the boundaries of the mirror
Squeeze the cleaning solution
Etc.

Based on the above example and description, a person of skill in the art will appreciate that the granularity of action commands may vary across different implementations of the present systems, methods, and computer program products. Furthermore, in accordance with the present systems, methods, and computer program products the action commands are advantageously "reusable" in the sense that each action command (or "work primitive") may be employed, invoked, applied, or "reused" in the performance of more than one overall work objective. For example, while cleaning a bathroom mirror may involve the action command "grasp the cleaning solution," other work objectives may also use the "grasp the cleaning solution" action command, such as for example "clean the toilet," "clean the window," and/or "clean the floor." In some implementations, action commands may be abstracted to become more generic and/or parameterizable. For example, "grasp the cleaning solution" may be abstracted to "grasp the spray bottle" or "grasp the *object1*" where the *object1* variable/parameter is defined as "*object1*=spray bottle", and "locate the mirror" may be abstracted to "locate the object that needs to be sprayed" or simply "locate *object2*" where "*object2*=mirror". In such cases, the "grasp the spray bottle" action command may be used in tasks that do not involve cleaning, such as "paint the wall" (where the spray bottle=spray paint), "style the hair" (where the spray bottle=hairspray), or "prepare the stir-fry meal" (where the spray bottle=cooking oil spray).

Returning to FIG. 1, the ordered set of action commands generated at 103 may be stored and provided for use at 104.

At 104, an automation program is generated (e.g., by a computer system) based on the ordered set of action commands generated at 103. The program may be generated by a computer system (comprising at least one processor and a non-transitory processor-readable storage medium communicatively coupled thereto) in a known programming language, such as python or similar. The program may be generated automatically by executing processor-executable instructions stored in the non-transitory processor-readable storage medium of the computer that, when executed, cause the at least one processor of the computer system to automatically generate a python program based on at least data corresponding to the ordered set of action commands generated at 103 (and, optionally, based also on data corresponding to the script generated at 102 and/or data collected form the agent performing the task at 101), and/or the program may be generated under the supervision, direction, influence, or instruction of a human programmer. In either case, at 104 a mapping is produced that converts the ordered set of action commands generated at 103 into an automation program executable by an autonomous robot system.

At 105, the robot executes the automation program generated at 104, which causes the robot to autonomously perform the task. In other words, the automation program generated at 104 is loaded into or accessed by the non-transitory processor-readable storage medium of the robot system and executed by at least one processor of the robot system to cause the robot system to autonomously perform the task. In some implementations, "causing the robot system to autonomously perform the task" may include causing the robot system to autonomously perform (e.g., auto-complete) each action command in the ordered set of action commands (or "workflow") generated at 103 based on the script generated at 102, based on the data collected at 101. In some implementations, act 105 may be repeated over multiple iterations with different conditions in order to confirm the generality, applicability, reliability, accuracy, consistency, and/or robustness of the task automation captured in the automation program. Refinements to the automation program may be made if needed to improve performance (e.g., robustness) of the automated task.

As used herein, the term "programming a robot" refers to the process of generating a program and executing the program by the robot. Thus, method 100 achieves its intended purpose of programming a robot to autonomously perform a task by, among other things, generating an automation program at 104 and executing the automation program at 105.

As an example, a robot may include or access a non-transitory processor-readable storage medium that stores: i) a library of five action commands: A, B, C, D, and E; and ii) five respective sets of processor-executable instructions inst(A), inst(B), inst(C), inst(D), and inst(E) that, when executed by at least one processor of the robot, each cause the robot to autonomously perform (e.g., auto-complete) a respective one of the five action commands. Following method 100, a robot may be programmed to autonomously perform a first task as follows: data is collected (at 101) while an agent performs the first task; a script is generated (at 102) based on the data, where the script characterizes an ordered set of discrete actions executed by the agent to perform the first task; and a first ordered set of action commands (or "first workflow") is generated (at 103). The first workflow may comprise, or consist of, a first set of action commands from the library of action commands arranged in a first order. In this example, the first workflow consists of action commands B, C, and D arranged as:

C→B→D

Continuing on, an automation program is generated (at 104) that, when executed (at 105) by the robot, causes the robot to autonomously execute the first workflow to complete the first task. That is, the automation program generated (at 104) comprises processor-executable instructions inst(C), inst(B), and inst(D), in order. At least one processor of the robot executes (at 105) the automation program, which causes the at least one processor or the robot to execute processor-executable instructions inst(C) to cause the robot to autonomously perform action command C, then causes the at least one processor of the robot to execute processor-executable instructions inst(B) to cause the robot to autonomously perform action command B, then causes the at least one processor of the robot to execute processor-executable instructions inst(D) to cause the robot to autonomously perform action command D. In this way, the robot autonomously performs the first task.

Advantageously, in accordance with the present systems, methods, and computer program products, the library of action commands stored or accessed by the robot may comprise, or consist of, all of the genericized activities, steps, or sub-tasks necessary to enable the robot to complete a multitude of different work objectives or tasks. In this way, the present systems, methods, and computer program products may deploy general purpose robots to automate a wide range of different tasks spanning a wide range of different work objectives in a wide range of different industries.

Continuing the example above, the exemplary library of five action commands may, for example, comprise:

A: measure environmental data
B: move to *position_x*
C: pick up *object_i*
D: put down *object_j*
E: barcode scan *object_k* and the first task being automated may be stated as: "move the green box to the storage room". The first workflow generated at 103 may be C→B→D, and a corresponding automation program generated at 104 may characterize the task performance as: start; inst(C); inst(B); inst(D); end. At 105, the robot executes the automation program, which causes the robot to: execute inst(C) where the *object_i* parameter="green box" which causes the robot to autonomously (i.e., with no further control or instruction from another party) pick up the green box; execute inst(B) where the *position_x* parameter="storage room" which causes the robot to autonomously carry the green box to the storage room; and execute inst(D) where the *object_j* parameter="green box" which causes the robot to autonomously put down the green box in the storage room. In this way, the automation program generated in method 100 causes the robot to autonomously perform the first task by performing the workflow C→B→D.

Using the same library of five action commands A, B, C, D, and E, the robot may complete a second task that is different from the first task. For example, a second task may be stated as: "make an inventory of the items in the storage room". In this example, data may be collected (at 101) while an agent performs the second task and a script may be generated (at 102) that characteries the discrete actions carried out by the agent based on the collected data. The script may be used as the basis for generating (at 103) a second ordered set of action commands (or second workflow), where each discrete action in the script (from 102) is mapped to one or more action commands that the robot is operative to autonomously perform. In a similar way to the first workflow, the second workflow also comprises, or consists of, a set of action commands (or reusable work primitives) from the library of five action commands A, B, C, D, and E; however, the second workflow is different from the first workflow in that the second workflow comprises a second, and different, ordered set (e.g., combination and/or permutation) of action commands from the library of five action commands A, B, C, D, and E.

In this example, the second workflow consists of action commands B, C, D, E arranged (e.g., ordered) as:

B→repeat:[C→E→D]

In accordance with the present systems, methods, and computer program products, at least one action command may be common in multiple workflows. In the present example, action commands B, C, and D are all commonly included in both the first workflow to complete the first task and the second workflow to complete the second task, but the first and second workflows are different from one another because the first and second tasks are different from another.

The exemplary second workflow includes "repeat: [C→E→D]"; therefore, in order to complete the second task the robot must repeat action commands C→E→D of the second workflow for all items in the storage room. Thus, a corresponding automation program generated at 104 may characterize the second task performance as: start; inst(B); repeat:[inst(C); inst(E); inst(D)]; end. At 105, executing the automation program causes the robot to execute the second workflow B→repeat:[C→E→D], which causes the robot to autonomously execute: inst(B) where the *position_x* parameter="storage room", which causes the robot to autonomously (i.e., with no further control or instruction from another party) go to the storage room; and then initiate a loop wherein the robot executes primitives C→E→D for all items in the storage room. That is, upon arriving in the storage room, the robot: executes inst(C) where the *object_i* parameter="first item" which causes the robot to autonomously pick up a first item in the storage room; executes inst(E) where the *object_k* parameter="first item" which causes the robot to autonomously bar code scan the first item; and executes inst(D) where the *object_j* parameter="first item" which causes the robot to put down the first item. The robot then repeats action commands C→E→D for each item in the storage room in series (i.e., for a second item, for a third item, and so on) until the robot has picked up, bar code scanned, and put down every item in the storage room. In this way, the robot completes the second task by autonomously performing the workflow B→repeat: [C→E→D].

Using the same library of five action commands A, B, C, D, and E, the robot may be programmed to autonomously perform at least one additional task. For example, the robot may be programmed to autonomously record environmental parameters at various stations or waypoints (repeat:[B→A]) and/or checkout customers' purchases at a retail store (repeat:[C→E→D]). These, and many other, tasks may all be autonomously performed by executing corresponding workflows comprising, or consisting of, various combinations and/or permutations of action commands from an exemplary library of five action commands A, B, C, D, and E. However, a person of skill in the art will appreciate that a library of action commands may consist of any number and form of action commands and the library of five action commands A, B, C, D, and E described herein is used only as an example for the purpose of illustration. Generally, the more action commands in a library of action commands the more different tasks may be operable to autonomously perform; however, in some implementations a finite number of action commands (e.g., on the order of 10s, such as 10, 20, 30, 40, 50, 60, 70, 80, 90; or on the order of 100s, such as 100, 200, etc.) may be sufficient to enable a robot to complete a significant portion (e.g., all) of the tasks of interest—and having fewer (e.g., the minimum number needed) action commands in the library of action commands can simplify the generation of the ordered set of action commands at 103 by reducing the number of possible mappings between discrete actions in the script at 103 and action commands in the ordered set (or workflow) at 104.

Figure 2:
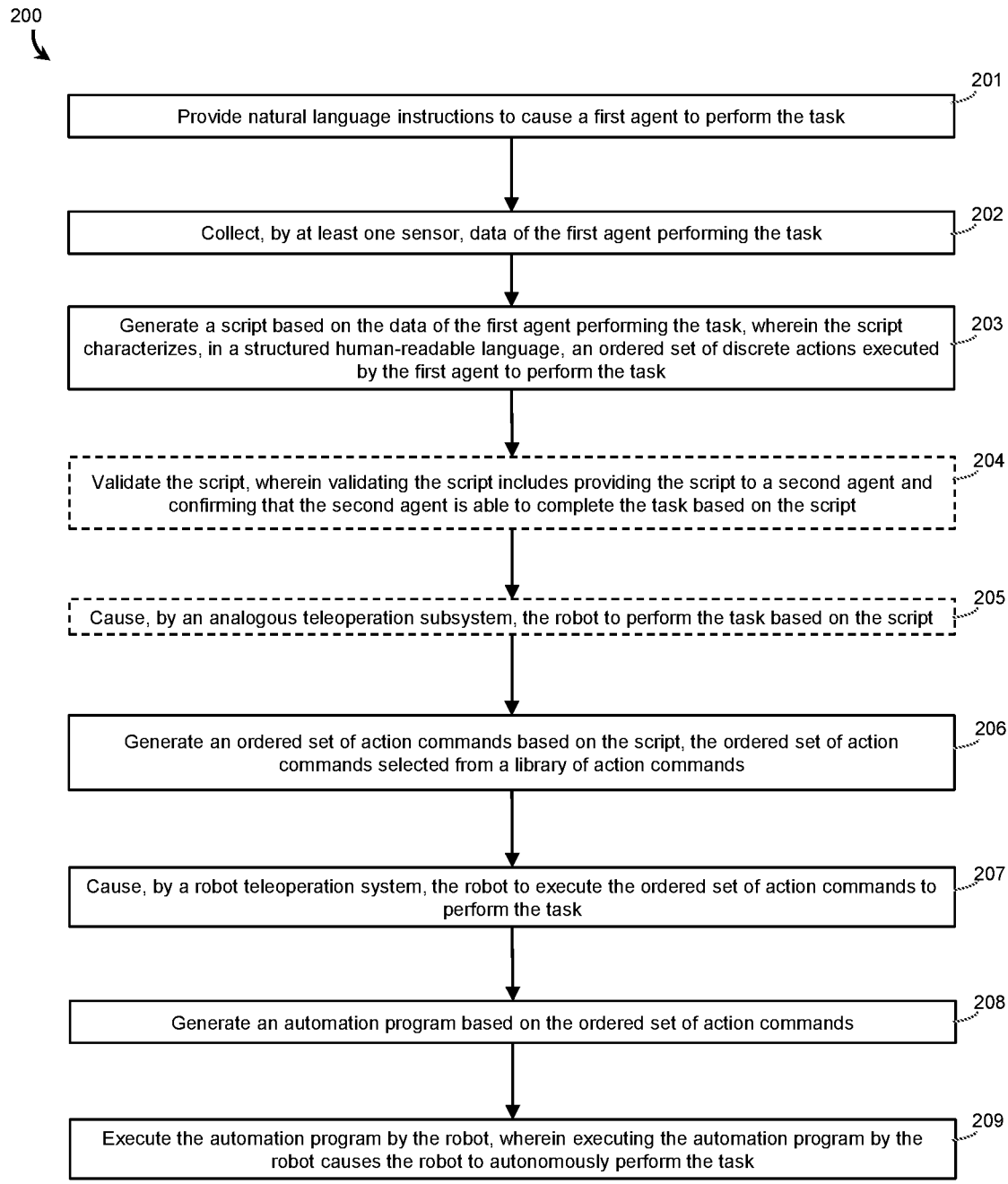
FIG. 2 is a flow diagram showing an exemplary method of automating a task in accordance with the present systems, methods, and computer program products.

FIG. 2 is a flow diagram showing an exemplary method 200 of automating a task in accordance with the present systems, methods, and computer program products. Similar to method 100 from FIG. 1, certain acts of method 200 may be performed by at least one processor or processing unit (hereafter "processor") of the a robot system communicatively coupled to a non-transitory processor-readable storage medium of the robot system and, in some implementations, certain acts of method 200 may be performed by peripheral components of the robot system that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. Method 200 includes nine acts 201, 202, 203, 204, 205, 206, 207, 208, and 209, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 201, natural language instructions are provided to a first agent to cause the first agent to perform the task. In various implementations, the first agent may be provided, and the first agent may receive, natural language instructions describing what the task is, various task parameters, and/or how to perform the task. The natural language instructions may be provided in verbal, oral, aural, and/or written form. Throughout the present systems, methods, and computer program products, the term "natural language" refers to any language that has evolved naturally in humans and includes as examples without limitation: English, French, Spanish, Chinese (Mandarin, Yue, Wu, etc.), Portuguese, Japanese, Russian, Korean, Arabic, Hebrew, German, Polish, Hindi, Bengali, Italian, Punjabi, Vietnamese, Hausa, Swedish, Finnish, and so on. The natural language instructions may be generated by a human task manager and/or an automated task management system. In some implementations, the first agent may be a first human worker. In other implementations, the first agent may be another robot, such as a special-purpose robot specifically designed to perform the task.

At 202, data of the first agent performing the task are collected by at least one sensor, similar to act 101 from method 100.

At 203, a script is generated based on the data (collected at 202) of the first agent performing the task, similar to 102 from method 100. The script characterizes, in a structured and human-readable language, an ordered set of discrete actions executed by the first agent to perform the task. The script may deploy elements of one or more natural language(s) but may omit or revise certain features of natural language such as grammar, syntax, punctuation, vocabulary, and/or expression. In some implementations, the language used to generate the script may resemble a pseudo-code with the objects, functions, and variables of a programming language replaced by actions and task parameters. In this context, the term "structured" in the context of the script is used to indicate that the language of the script deploys a structure analogous to a computer programming language in terms of syntax, punctuation, and spacing and does not permit the freeform and/or stylistic sentence structure typically deployed in a natural language (and which may be deployed in the natural language instructions at 201). However, the term "human-readable" indicates that the language of the script uses words from the vocabulary of at least one natural language.

An example of a script for the simple task of sorting a mixture of two object types into two bins includes:
  Pick up an object of type A
  Place the object of type A into the bin on the right
  Pick up an object of type B
  Place the object of type B into the bin on the left
  . . .
  [and so on, until all of the objects are placed in the corresponding bins]

In the example above, the structure of the language of the script includes a series of statements of the following format: [action] the [object] to [outcome], where the components [action], [object], and [outcome] may be treated as variables or task parameters. However, this is just an example of a form of structure that may be deployed by the language used to generate the script in some implementations of act 203. In some implementations, the language of the script may include or allow for conditional statements such as If . . . then statements, if . . . elseif . . . statements, for loops, and/or do . . . while loops.

In some implementations, the script generated at 203 characterizes the task in terms of the fundamental discrete actions that are executed, and in what order, in the performance of the task. In other words, at 203 a mapping from the natural language instructions to a discrete set of actions performed by the first agent is generated.

In some implementations, the first agent may be a worker who already has familiarity with the nature of the task to be performed and automated in method 200. For example, if method 200 is deployed to automate a task in a retail environment, then in some implementations the first agent may have experience working in retail environments. Such can be advantageous because, in accordance with acts 202 and 203, the manner in which the first agent performs the task based on the natural language instructions at 201 can, in some implementations, affect the data collected at 202 and the script generated at 203, and ultimately affect the manner in which the task is performed when automated. Thus, it can be advantageous to ensure that the first agent is sufficiently familiar with and/or proficient at the task that they perform the task well/efficiently/optimally at 201. In some implementations, the first agent may be a first human worker referred to as a "field service associate".

Figure 3:
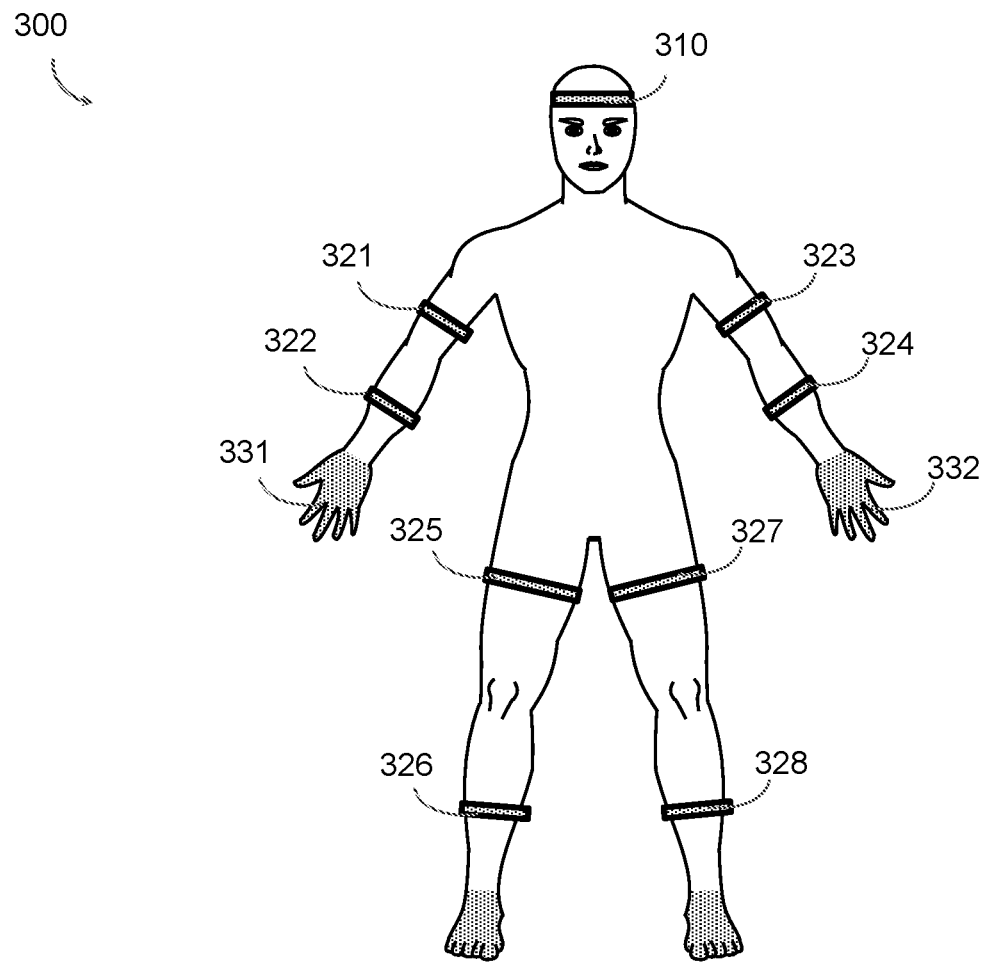
FIG. 3 is an illustrative diagram of an exemplary agent in accordance with the present systems, methods, and computer program products.

FIG. 3 is an illustrative diagram of an exemplary field service agent ("FSA"), or agent, 300 in accordance with the present systems, methods, and computer program products. FSA 300 wears multiple sensors on their body, including a head-mounted camera system (with microphone) 310 and IMU systems 321, 322, 323, 324, 325, 326, 327, and 328 carried on their arms and legs, as well as respective sets of tactile sensors 331, 332 carried in gloves worn on their hands. In some implementations, more, fewer, or different sensors may be deployed on an FSA. For example, in some implementations FSA 300 may also wear sensory footwear providing step counts and/or haptic/tactile data from their feet. In some implementations, FSA 300 may wear only head-mounted camera system 310 and no other sensors. The specific configuration of sensors deployed on or by an FSA may depend on the nature of the task(s) that the FSA performs. In accordance with act 202 of method 200, any/all of sensors 310, 321, 322, 323, 324, 325, 326, 327, 328, 331, and/or 332 and/or other sensors, may collect data while FSA 300 performs a task. Such data may subsequently be used/analyzed to identify an ordered set of discrete fundamental actions executed by FSA 300 in performing the task, and such ordered set of discrete fundamental actions may be captured in a script at 203 of method 200.

Returning to FIG. 2, act 204 is optional. In implementations of method 200 that include act 204, at 204 the script generated at 203 is validated. Validating the script at 204 may include testing and confirming the useability, quality, and/or robustness of the script. Validating the script at 204 may include, for example, providing the script to a second agent (the second agent different from the first agent) and confirming that the second agent is able to complete the task based on (e.g., by following) the script. When the first agent is a first human worker, the second agent may be, for example, a second human worker that is different from the first human worker. By validating the script at 204, any deficiencies in the generality/applicability of the script may be identified (e.g., if the second human worker encounters an error or is otherwise unable to complete the task by following the script) and corrected. That is, validating the script at 204 may include updating or revising the script to ensure that performing the discrete actions characterized in the script results in successful performance of the task regardless of the agent that is executing the script.

Acts 205 (which is optional), 206, 207, and 209 of method 200 all deploy a robot system that, depending on the specific act, may interact with various subsystems.

Figure 4:
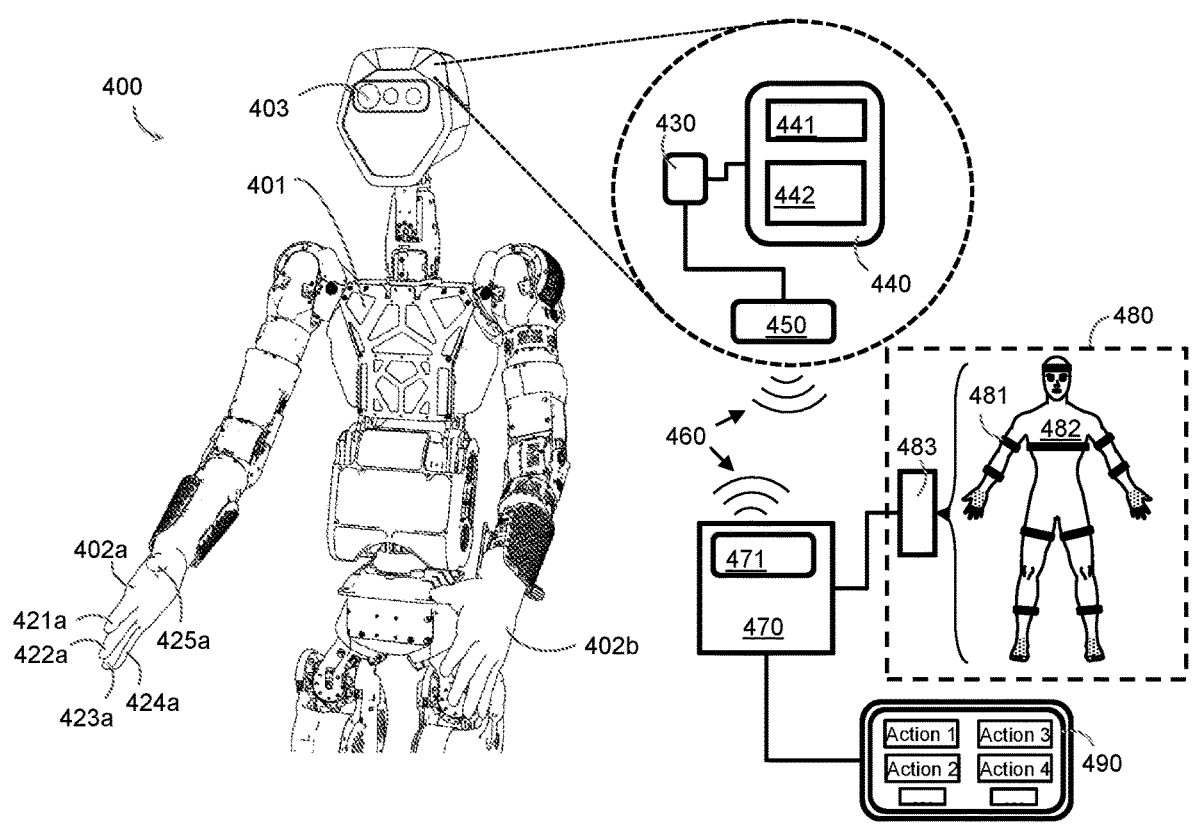
FIG. 4 is an illustrative diagram of an exemplary robot system comprising various features and components described throughout the present systems, methods and computer program products.

FIG. 4 is an illustrative diagram of an exemplary robot system 400 comprising various features and components described throughout the present systems, methods and computer program products. Robot system 400 comprises a robot body 401 with a first physically actuatable component 402a and a second physically actuatable component 402b mechanically coupled to body 401. In the illustrated implementation, first and second physically actuatable components 402a and 402b each correspond to a respective robotic hand, though a person of skill in the art will appreciate that in alternative implementations a physically actuatable component may take on other forms (such as an arm or leg, a non-hand-like end effector such as a cutter or suction tube, or any other form useful to the particular applications the robot is intended to perform). Robotic hand 402a emulates a human hand and includes multiple fingers 421a, 422a, 423a, and 424a and an opposable thumb 425a. Robotic hand 402b is similar to a mirror-image of robotic hand 402a while corresponding details are not labeled for robotic hand 402b to reduce clutter. Robotic hands 402a and 402b may be physically actuatable by a variety of different means, including electromechanical actuation, cable-driven actuation, magnetorheological fluid-based actuation, and/or hydraulic actuation. Some exemplary details of actuation technology that may be employed to physically actuate robotic hands 402a and 402b are described in U.S. patent application Ser.

No. 17/491,577 and U.S. patent application Ser. No. 17/749,536, both of which are incorporated by reference herein in their entirety.

Robot body 401 further includes at least one sensor 403 that detects and/or collects data about the environment and/or objects in the environment of robot system 400. In the illustrated implementation, sensor 403 corresponds to a sensor system including a camera, a microphone, and an inertial measurement unit that itself comprises three orthogonal accelerometers, a magnetometer, and a compass. As described previously in relation to FSA 300 and act 101 of method 100 (and similarly act 202 of method 200), an analogous sensor system comprising a camera, microphone, and inertial measurement unit may advantageously be worn by the agent/FSA to collect data while the agent/FSA performs a task.

For the purposes of illustration, FIG. 4 includes details of certain exemplary components that are carried by or within robot body 401 in accordance with the present systems, methods, and computer program products. Such components include at least one processor 430 and at least one non-transitory processor-readable storage medium, or "memory", 440 communicatively coupled to processor 430. Memory 440 stores processor-executable instructions 442 (e.g., together as a computer program product) that, when executed by processor 430, cause robot system 400 (including robot body 401 and applicable actuatable components such as either or both of robotics hands 402*a* and/or 402*b*) to perform actions and/or functions in association with methods 100 and/or 200.

Processor 430 is also communicatively coupled to a wireless transceiver 450 via which robot body 401 sends and receives wireless communication signals 460 with an exemplary robot teleoperation system 470. To this end, robot teleoperation system 470 also includes a wireless transceiver 471 to send and receive wireless communication signals 460.

For the purposes of illustration, robot teleoperation system 470 includes both an analogous teleoperation subsystem 480 and a graphical user interface 490. Analogous teleoperation subsystem 480 includes a sensor system 481 that detects real physical actions performed by a human pilot 482 and a processing system 483 that converts such real physical actions into low-level teleoperation instructions that, when executed by processor 430, cause robot body 401 (and any applicable actuatable components such as hands 402*a* and/or 402*b*) to emulate the physical actions performed by pilot 482. In some implementations, sensor system 481 may include many sensory components typically employed in the field of virtual reality games, such as haptic gloves, accelerometer-based sensors worn on the body of pilot 482, and a VR headset that enables pilot 482 to see optical data collected by sensor 403 of robot body 401. Graphical user interface ("GUI") 490 includes a simple GUI displayed, in this exemplary implementation, on a tablet computer. GUI 490 provides a set of buttons each corresponding to a respective action command autonomously performable by robot body 401 (and applicable actuatable components such as hands 402*a* and/or 402*b*). Action command(s) selected by a user/pilot of GUI 490 are converted into high-level teleoperation instructions that, when executed by processor 430, cause robot body 401 (and any applicable actuatable components such as hands 402*a* and/or 402*b*) to perform the selected action command(s).

Returning to method 200, act 205 is optional. In implementations of method 200 that include act 205, at 205 an analogous teleoperation subsystem (e.g., 480 of FIG. 4) causes a robot to perform the task based on the script generated at 203 (and optionally validated at 204). In implementations of method 200 that include act 204, act 205 may be similar to act 204 except that at 205 the "second agent" is piloting an analogous teleoperation subsystem 480 to cause a teleoperated robot to perform the task, rather than performing the task directly him/herself. In other words, at 205 a robot is performing the task but under complete manual control by a pilot of the analogous teleoperation subsystem and not autonomously. Thus, at 205, causing, by the analogous teleoperation subsystem, a robot to perform the task based on the script may include causing, by analogous teleoperation subsystem 480, the robot 401 to perform the task based on the script under manual control by a pilot 482, which itself may include capturing, by the analogous teleoperation subsystem 480, data of the pilot 482 performing the sequence of discrete actions characterized in the script and causing, in real-time, the robot 401 to emulate the actions performed by the pilot 482.

In some implementations, additional data of the pilot 482 performing the discrete actions characterized in the script and/or of the robot 401 emulating actions of the pilot 482 to perform the discrete actions characterized in the script may be collected and used to further refine the script (e.g., by refining various task parameters characterized in the script based on the additional data collected). Similarly, if any errors or deficiencies are identified at 205 that cause the robot to struggle or be unable to perform the task, the script may be adapted to address and overcome such errors and/or deficiencies.

At 206, the robot teleoperation system 470 generates an ordered set of action commands (or workflow) based on the script. The ordered set of action commands may be selected by, or received from, an operator of a GUI 490, from a library of action commands available in the GUI 490. As discussed previously, the library of action commands available in the graphical user interface may comprise, or consist of, all genericized reusable work primitives necessary to enable the robot to complete multiple different work objectives or tasks. In other words, the library of action commands available in the graphical user interface may comprise, or consist of, a library of parameterizable action commands that the robot is operative to auto-complete upon receipt of execution instructions from the graphical user interface 490.

In some implementations, the GUI 490 may include a point and click display that lists or otherwise presents action commands (e.g., as selectable buttons) corresponding to discrete physical (and/or analytical) actions that the robot 401 is operative to autonomously perform. Thus, at 206 the robot teleoperation system 470 may generate (e.g., in response to GUI interactions by or from an operator of the GUI 490) a mapping between the script generated at 203 (i.e., the set of parameterized discrete actions characterized in the script) and an ordered set of action commands or action command instructions corresponding to discrete physical/analytical actions that the robot is operative to autonomously perform.

At 207, the robot teleoperation system 470 causes the robot 401 to perform the task semi-autonomously based on the ordered set of action commands (or workflow) generated at 206. In some implementations, causing, by the robot teleoperation system 470, the robot 401 to perform the task based on the ordered set of action commands may include causing, by the robot teleoperation system 470, the robot 401 to auto-complete each parameterizable action command in the ordered set of action commands in order to semi-autonomously perform the task. Thus, performance of the task by the robot at 207 is said to be "semi-autonomous" because in performing the task based on the ordered set of action commands, the robot autonomously performs (e.g., "auto-completes") each action command but in response to third party (either human or other subsystem) instruction regarding the particular combination and permutation (i.e., ordered set) of action commands to complete. In implementations of method 200 that include optional act 205, any errors or deficiencies in the performance of the task by the robot at 207 may be attributed to the ordered set of action commands generated at 206 (since the robot was previously able to perform the task based on the script under analogous teleoperation at 205) and may be corrected through revisions to the ordered set of action commands generated at 206.

At 208, an automation program is generated (e.g., by a computer system) based on the ordered set of action commands generated at 207, substantially as described for act 104 of method 100.

At 209, the robot executes the automation program generated at 208, which causes the robot to autonomously perform the task. Act 209 of method 200 is substantially similar to act 105 from method 100.

In accordance with the present systems, methods, and computer program products, any or all of acts 205, 207, and/or 209 may be performed in the real world environment using a real physical robot performing a real task or in a simulated environment using a simulated instance of the robot performing a simulated instance of the task. In either case, the same, or substantially similar, processor-executable instructions may be used to control or govern the actions of the real/simulated robot. An advantage of causing a simulated instance of the robot in a simulated environment to perform a simulated instance of the task is that doing so does not impose any wear and tear on the physical hardware of the real physical robot and does not pose any physical risk to real objects in the real world environment. Thus, instead of or before a real physical robot is deployed/caused to perform a real instance of a task in the real world environment (at an iteration of act 205, 207, and/or 209), a training process may involve causing any number of simulated instances of the robot to repeatedly perform any/all of acts 205, 207, and/or 209 to repeatedly perform any number of simulated instances of the task in any number of simulated environments. In the early stages of training, a robot may be so inept at performing an action or action command that its early attempts at doing so could cause damage to itself or its surroundings. For example, the robot could cause itself to fall over or collide with objects in its environment. Training a simulated instance of the robot in a simulated environment avoids such risks to the real physical robot.

A further advantage of training a simulated instance of the robot in a simulated environment is that the training process may be accelerated by parallelization. In some implementations, any number of additional simulated instances of the robot may be generated in the simulated environment and trained in parallel alongside the first simulated instance of the robot.

Training in simulation has the further advantage that it may be done continuously and without interruption for extended periods of time (i.e., without pauses or rests).

Figure 5:
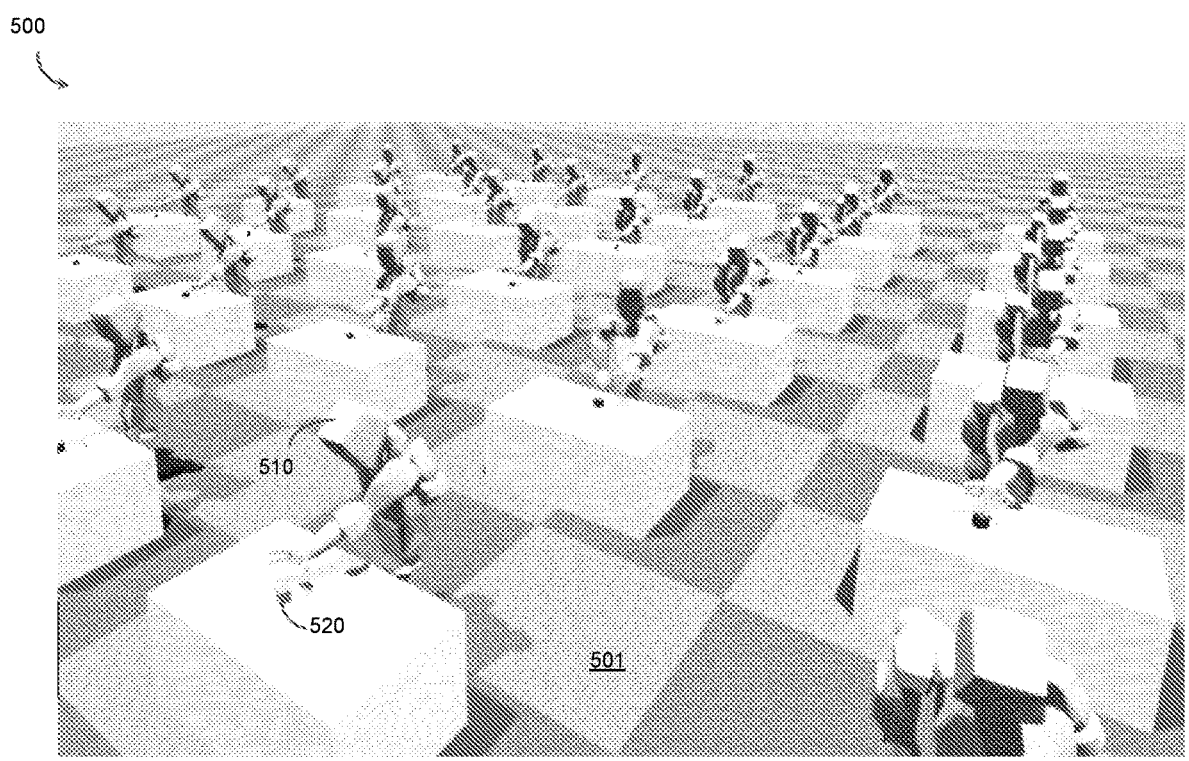
FIG. 5 is an illustrative diagram showing an exemplary simulated environment in which a robot is trained through simulation to perform a task in accordance with the present systems, methods, and computer program products.

FIG. 5 is an illustrative diagram showing an exemplary simulated environment 500 in which a robot is trained through simulation to perform a task in accordance with the present systems, methods, and computer program products. Simulated environment 500 includes a simple space having a flat ground 501 and is not based on any real-world space. Multiple simulated instances of a real-world robot are present in simulated environment 500, with only an exemplary first simulated instance 510 called out in FIG. 5 to reduce clutter. Each simulated instance of the robot 510 is repeatedly performing a simulated instance of a particular grasp action command in order to grasp a respective simulated object 520 (only one exemplary simulated object 520 is called out in FIG. 5 to reduce clutter). In accordance with the present systems, methods, and computer program products, the simulated instances of the robot 510 are each training to autonomously perform a simulated instance of the same task, because parallelizing such training over multiple simulated instances can vastly expedite the training process compared to doing so with real physical robot hardware while at the same time mitigate any damages or wear and tear on real-world physical components or objects. Depending on the quality of the simulation, the same or substantially similar processor-executable instructions used to control the operation of the simulated instances of the robot 510 and trained to optimize autonomous performance of the task may be ported from the simulation.

As described above in relation to act 203, a script based on the data collected at 202 may be generated manually by a human scripter or automatically by a "scripting system" in the form of a computer system comprising at least one processor communicatively coupled to at least one non-transitory processor-readable storage medium that stores data and/or processor-executable instructions that, when executed by the at least one processor, cause the at least one processor to automatically generate the script. In the latter scenario, the data and/or processor-executable instructions that cause the at least one processor to automatically generate the script may include a reasoning system operative to identify and analyze the start and end states of the task from the data collected at 202 and reason about how to deploy actions from the available library of action commands to interpolate in between such start and end states. The interpolation may be validating against and/or supported by analysis of the additional data collected at 202 corresponding to states in between the start and end states. In some implementations, start and end states may be characterized in relation to the task as a whole, or on a piece-by-piece basis in relation to individual portions of data, such as between individual frames of video data or subsets of frames of video data (e.g., start state 1 characterized by frame 1, end state 1 characterized by frame 10, start state 2 characterized by frame 10, end state 2 characterized by frame 20, and so on, with interpolation between respective pairs of start/end states). In this way, not only does method 200 provide a method of automating a task (repeatedly over any number of tasks of any number of different types), but method 200 also provides a basis for a method of automating the automation of tasks.

The reasoning system could be a logic-based system or reasoning engine, such as the CYC® machine reasoning AI platform from Cycorp Inc., as a non-limiting example. Reasoning engines (sometimes called inference engines) can utilize a library of logical rules, statements, terms, pieces of knowledge, or similar, and can make logical conclusions based on the same. In this way, a script as referenced in method 200 can be validated by a reasoning engine, by comparing the script to a set of rules (or similar) specified at least in part of a reasoning engine. That is, at least a part of the logic of a reasoning engine can be applied to a script to validate whether the script makes logical sense, and/or to identify any logical inconsistencies or impossibilities in the script. In some implementations, such a reasoning system may be invoked to valid a script per optional act 204 of method 200.

For example, in some implementations, acts 201 and 202 may be skipped and a sufficiently sophisticated scripting system may automatically generate a script based on only natural language instructions for performing a task. That is, the natural language instructions from act 201 of method 200 may be provided directly to a sophisticated scripting system rather than to an agent, and no data of an agent performing the task may be collected or needed. Such sophistication in the scripting system may be developed using machine learning and/or artificial intelligence-based training algorithms over multiple iterations of method 100 and/or method 200 across multiple different tasks. In such implementations, there may be no end state data available for the scripting system to reason upon and therefore the scripting system may include data and/or processor-executable instructions that, when executed by the at least one processor, cause the scripting system to create a model of what the end state will be.

The present systems, methods, and computer program products include a multi-step task automation framework that involves the automation of a small sub-part of the cognition loop in each step, providing a smooth gradient towards task automation. Such framework is task-agnostic in the sense that it may work for a very wide range of different types of tasks, though some tasks are generally easier to automate than others. To this end, in some implementations it can be advantageous to begin deploying method 100 and/or method 200 in the automation of simpler tasks comprising fewer and/or less complicated steps in order to improve the process (e.g., scripting) ahead of more complex tasks.

A general purpose robot is able to complete multiple different tasks. As used throughout this specification and the appended claims, the term "task" refers to a particular work objective, job, assignment, or application that has a specified goal and a determinable outcome, often (though not necessarily) in the furtherance of some personal pursuit or economically valuable work. Tasks exist in many aspects of business, research and development, commercial endeavors, and personal activities. Exemplary tasks include, without limitation: cleaning a location (e.g., a bathroom) or an object (e.g., a bathroom mirror), preparing a meal, loading/unloading a storage container (e.g., a truck), taking inventory, collecting one or more sample(s), making one or more measurement(s), building or assembling an object, destroying or disassembling an object, delivering an item, harvesting objects and/or data, and so on. The various implementations described herein provide systems, methods, and computer program products for initializing, configuring, training, operating, and/or deploying a robot to autonomously complete multiple different tasks.

In accordance with the present systems, methods, and computer program products, a task is deconstructed or broken down into an "ordered set of actions" and/or an "ordered set of action commands", where successful completion of the task involves performing each action/action command in the ordered set. Depending on the specific implementation, completion of a task may be achieved by (i.e., an ordered set may comprise): i) performing a corresponding set of actions/action commands sequentially or in series; ii) performing a corresponding set of actions/action commands in parallel; or iii) performing a corresponding set of actions/action commands in any combination of in series and in parallel (e.g., sequentially with overlap) as suits the task and/or the robot performing the task.

The robot systems described herein may, in some implementations, employ any of the teachings of U.S. Provisional Patent Application Ser. No. 63/410,475; U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. patent Publication No. US 2021-0307170 A1, and/or U.S. patent application Ser. No. 17/386,877, as well as U.S. Provisional Patent Application Ser. No. 63/151,044, U.S. patent application Ser. No. 17/719,110, U.S. patent application Ser. No. 17/737,072, U.S. patent application Ser. No. 17/846,243, U.S. patent application Ser. No. 17/566,589, U.S. patent application Ser. No. 17/962,365, U.S. patent application Ser. No. 18/089,155, U.S. patent application Ser. No. 18/089,517, U.S. patent application Ser. No. 17/985,215, U.S. patent application Ser. No. 17/883,737, U.S. Provisional Patent Application Ser. No. 63/441,897, and/or U.S. patent application Ser. No. 18/117,205, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, methods, and computer program products. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of automating a task, the method comprising:
providing natural language instructions to cause a first agent to perform the task;
collecting, by at least one sensor, data of the first agent performing the task;
generating a script based on the data of the first agent performing the task, wherein the script characterizes, in a structured human-readable language, an ordered set of discrete actions executed by the first agent to perform the task;
causing, by an analogous teleoperation subsystem of a robot teleoperation system, the robot to perform the task based on the script;
generating an ordered set of action commands based on the script, the ordered set of action commands selected from a library of action commands;
causing, by the robot teleoperation system, the robot to execute the ordered set of action commands to perform the task;
generating an automation program based on the ordered set of action commands; and
executing the automation program by the robot, wherein executing the automation program by the robot causes the robot to autonomously perform the task.

2. The method of claim 1 wherein the first agent is a human worker and the robot is a humanoid robot.

3. The method of claim 1 wherein the library of action commands available in the robot teleoperation system comprises all genericized reusable work primitives necessary to enable the robot to complete multiple different tasks.

4. The method of claim 1 wherein the library of action commands available in the robot teleoperation system comprises a library of parameterizable action commands, each of which the robot is operative to auto-complete upon receipt of execution instructions from the robot teleoperation system.

5. The method of claim 4 wherein causing, by the robot teleoperation system, the robot to execute the ordered set of action commands to perform the task includes causing, by the robot teleoperation system, the robot to auto-complete each parameterizable action command in the ordered set of action commands to semi-autonomously perform the task.

6. The method of claim 1 wherein causing, by the robot teleoperation system, the robot to execute the ordered set of action commands to perform the task includes causing, by the robot teleoperation system, a simulated instance of the robot to execute the ordered set of action commands to perform a simulated instance of the task.

7. The method of claim 1, further comprising causing, by the robot teleoperation system, a simulated instance of the robot to execute the ordered set of action commands to perform a simulated instance of the task before causing, by the robot teleoperation system, the robot to execute the ordered set of action commands to perform the task.

8. The method of claim 1 wherein the robot teleoperation system comprises a graphical user interface, and wherein generating, by the robot teleoperation system, the ordered set of action commands based on the script includes:
presenting, by the graphical user interface of the robot teleoperation system, at least a portion of the library of action commands to a user; and
receiving, by the graphical user interface of the robot teleoperation system, a selection of the ordered set of action commands from the user.

9. The method of claim 1 wherein causing, by the analogous teleoperation subsystem, the robot to perform the task based on the script includes causing, by the analogous teleoperation subsystem, the robot to perform the task based on the script under manual control by a pilot.

10. The method of claim 9 wherein causing, by the analogous teleoperation subsystem, the robot to perform the task based on the script under manual control by the pilot includes capturing, by the analogous teleoperation subsystem, data of the pilot performing the ordered set of discrete actions characterized in the script and causing, in real-time, the robot to emulate the ordered set of discrete actions performed by the pilot.

11. The method of claim 9 wherein causing, by the analogous teleoperation subsystem, the robot to perform the task based on the script under manual control by the pilot includes causing, by the analogous teleoperation subsystem, a simulated instance of the robot to perform a simulated instance of the task based on the script under manual control by the pilot.

12. The method of claim 9, further comprising causing, by the analogous teleoperation subsystem, a simulated instance of the robot to perform a simulated instance of the task based on the script under manual control by the pilot before causing, by the analogous teleoperation subsystem, the robot to perform the task based on the script under manual control by the pilot.

13. The method of claim 1, further comprising:
validating the script before generating, by the robot teleoperation system, the ordered set of action commands based on the script, wherein validating the script includes providing the script to a second agent and confirming that the second agent is able to perform the task based on the script.

14. The method of claim 1 wherein generating a script based on the data of the first agent performing the task includes executing, by at least one processor, processor-executable instructions that cause the at least one processor to automatically generate the script based on the data of the first agent performing the task.

15. The method of claim 1 wherein executing the automation program by the robot, wherein executing the automation program by the robot causes the robot to autonomously perform the task, includes executing the automation program by a simulated instance of the robot, wherein executing the automation program by the simulated instance of the robot causes the simulated instance of the robot to autonomously perform a simulated instance of the task.

16. The method of claim 1, further comprising executing the automation program by a simulated instance of the robot, wherein executing the automation program by the simulated instance of the robot causes the simulated instance of the robot to autonomously perform a simulated instance of the task before executing the automation program by the robot, wherein executing the automation program by the robot causes the robot to autonomously perform the task.

17. The method of claim 1 wherein generating an ordered set of action commands based on the script includes mapping each discrete action in the script to at least one action command in the library of action commands.

18. A method of programming a robot to autonomously perform a task, the method comprising:
collecting data of an agent performing the task;
generating a script based on the data of the agent performing the task, wherein the script characterizes an ordered set of discrete actions executed by the agent to perform the task;
causing, by an analogous teleoperation subsystem of a robot teleoperation system, the robot to perform the task based on the script;
generating an ordered set of action commands based on the script, the ordered set of action commands selected from a library of action commands, each of which the robot is operative to autonomously execute;
generating an automation program based on the ordered set of action commands; and
executing the automation program by the robot, wherein executing the automation program by the robot causes the robot to autonomously perform the task.

19. The method of claim 18 wherein executing the automation program by the robot causes the robot to autonomously perform each action command in the ordered set of action commands in order to complete the task.

* * * * *